United States Patent
Eldeeb

(10) Patent No.: US 7,369,657 B2
(45) Date of Patent: May 6, 2008

(54) CRYPTOGRAPHY ACCELERATOR APPLICATION PROGRAM INTERFACE

(75) Inventor: Abdel Raouf Eldeeb, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 756 days.

(21) Appl. No.: 10/378,054

(22) Filed: Feb. 27, 2003

(65) Prior Publication Data

US 2004/0098600 A1 May 20, 2004

Related U.S. Application Data

(60) Provisional application No. 60/426,581, filed on Nov. 14, 2002.

(51) Int. Cl.
H00L 9/00 (2006.01)
H04K 1/00 (2006.01)

(52) U.S. Cl. .......................................... 380/28; 713/164

(58) Field of Classification Search ................... 380/28
See application file for complete search history.

(56) References Cited

U.S. PATENT DOCUMENTS

| | | | | |
|---|---|---|---|---|
| 5,029,206 A | * | 7/1991 | Marino et al. ............... | 713/164 |
| 5,313,585 A | * | 5/1994 | Jeffries et al. ............... | 711/201 |
| 5,727,065 A | * | 3/1998 | Dillon .......................... | 705/52 |
| 5,883,956 A | * | 3/1999 | Le et al. ...................... | 713/170 |
| 5,941,970 A | * | 8/1999 | Lange .......................... | 710/314 |
| 6,157,955 A | * | 12/2000 | Narad et al. ................. | 709/228 |
| 6,185,681 B1 | * | 2/2001 | Zizzi ........................... | 713/165 |
| 6,351,813 B1 | * | 2/2002 | Mooney et al. .............. | 713/185 |
| 6,625,734 B1 | * | 9/2003 | Marvit et al. ................. | 726/28 |
| 6,831,979 B2 | * | 12/2004 | Callum ......................... | 380/28 |
| 6,999,762 B2 | * | 2/2006 | Uchida .................... | 455/432.1 |
| 7,051,199 B1 | * | 5/2006 | Berson et al. .............. | 713/150 |
| 2002/0116664 A1 | * | 8/2002 | Tu et al. ........................ | 714/31 |
| 2003/0046532 A1 | * | 3/2003 | Gast ............................. | 713/151 |
| 2003/0182560 A1 | * | 9/2003 | Brizek ......................... | 713/189 |
| 2004/0039928 A1 | * | 2/2004 | Elbe et al. ................... | 713/189 |

OTHER PUBLICATIONS

Elmasri et al., "Fundamentals of Database Design," 1989, pp. 541-542.*

* cited by examiner

*Primary Examiner*—Matthew Heneghan
(74) *Attorney, Agent, or Firm*—Sterne Kessler Goldstein & Fox, P.L.L.C.

(57) ABSTRACT

Methods and apparatus are provided for making function calls to various cryptography accelerators. An application program interface abstraction layer coupled to a cryptography accelerator receives generic function calls from designer configured software and performs operations such as security association management, policy management, packet processing, cryptography accelerator configuration, and key commit management. Upon receiving a generic function call, the abstraction layer performs processing to make a chip specific function call or update abstraction layer management information associated with the generic function call.

46 Claims, 8 Drawing Sheets

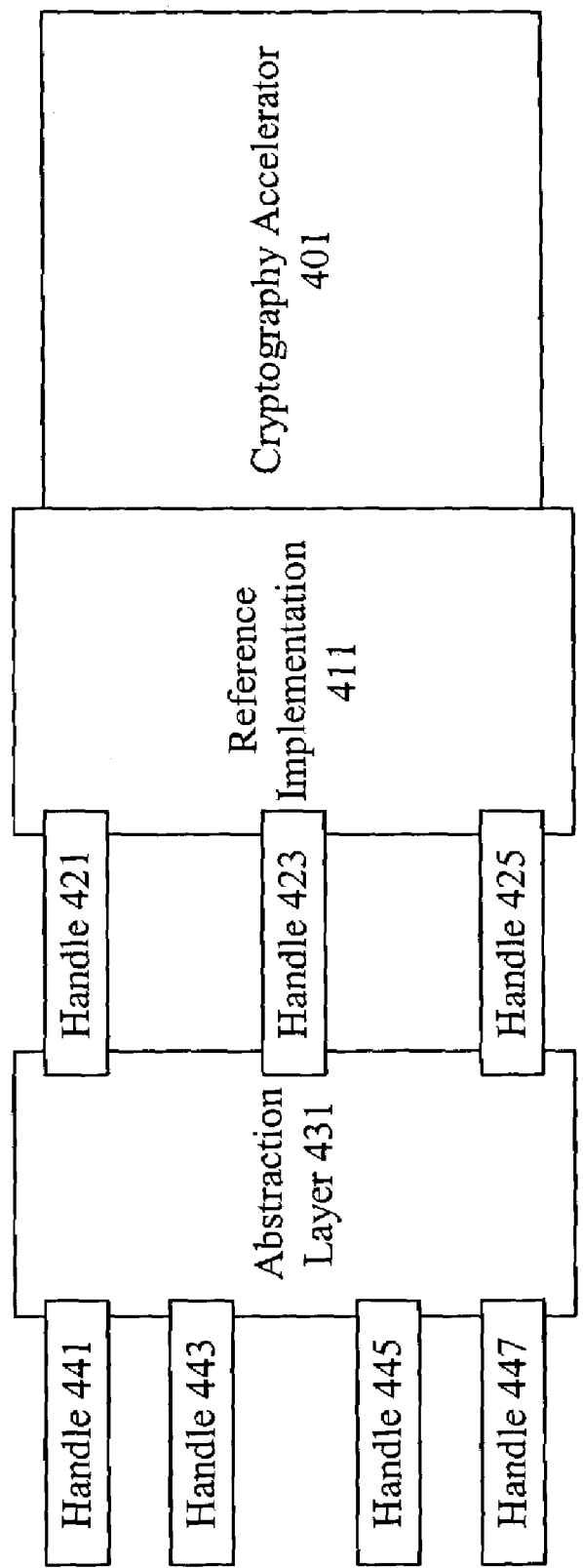

CRYPTOGRAPHY ACCELERATOR APPLICATION PROGRAM INTERFACE

CROSS REFERENCE TO RELATED APPLICATIONS

This application claims priority under U.S.C. 119(e) from U.S. Provisional Application No. 60/426,581, entitled Cryptography Accelerator Application Program Interface, at the time of filing on Nov. 14, 2002, by Abdel Raouf Eldeeb, the disclosure of which is herein incorporated by reference for all purposes.

BACKGROUND OF THE INVENTION

1. Field of the Invention

The present application relates to cryptography accelerators. More specifically, the present application relates to methods and apparatus for making functions calls to various cryptography accelerators.

2. Description of Related Art

Software techniques for performing encryption and authentication operations, such as DES, RC4, MD5 and SHA1 operations have been inefficient and resource intensive. Many encryption and authentication operations are described in Applied Cryptography, Bruce Schneier, John Wiley & Sons, Inc. (ISBN 0471128457), incorporated by reference in its entirety for all purposes. The inefficiency has led to the development of a number of different cryptography accelerators for performing a variety of encryption and authentication operations. However, mechanisms for directly accessing various cryptography accelerators are limited.

It is therefore desirable to provide methods and apparatus for improving access to various cryptography accelerators.

SUMMARY OF THE INVENTION

Methods and apparatus are provided for making function calls to various cryptography accelerators. An application program interface abstraction layer coupled to a cryptography accelerator receives generic function calls from designer configured software and performs operations such as security association management, policy management, packet processing, cryptography accelerator configuration, and key commit management. Upon receiving a generic function call, the abstraction layer performs processing to make a chip specific function call or update abstraction layer management information associated with the generic function call.

In one embodiment, a method for configuring and managing a cryptography accelerator is provided. A packet is received at an application program interface abstraction layer. The application program interface abstraction layer is operable to communicate with a plurality of different cryptography accelerators each supporting different features. The application program interface abstraction layer is coupled to a first cryptography accelerator. Security association information corresponding to the packet is identified. Data associated with the packet is sent to the first cryptography accelerator.

In another embodiment, a cryptography accelerator is provided. The cryptography accelerator includes an interface configured to receive data associated with a packet from an application program interface abstraction layer. The application program interface abstraction layer is operable to communicate with a plurality of different cryptography accelerators each supporting different features. The application program interface abstraction layer provides a set of generic handles for configuring and using the cryptography accelerator. The cryptography accelerator also includes a cryptography processing engine operable to encrypt and decrypt data received from the interface.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which are illustrative of specific embodiments of the present invention.

FIG. 4 is a diagrammatic representation showing host interaction with an application programming interface abstraction layer.

DETAILED DESCRIPTION OF SPECIFIC EMBODIMENTS

The present application relates to implementing a cryptography accelerator. More specifically, the present application relates to methods and apparatus for providing an abstraction layer for communicating with cryptography accelerators.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of security association information and policy management information associated with the DES encryption algorithms and the SHA-1 and MD5 authentication algorithms. However, it should be noted that the techniques of the present invention can be applied to a variety of different authentication and cryptography operations for cryptography processing in general. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
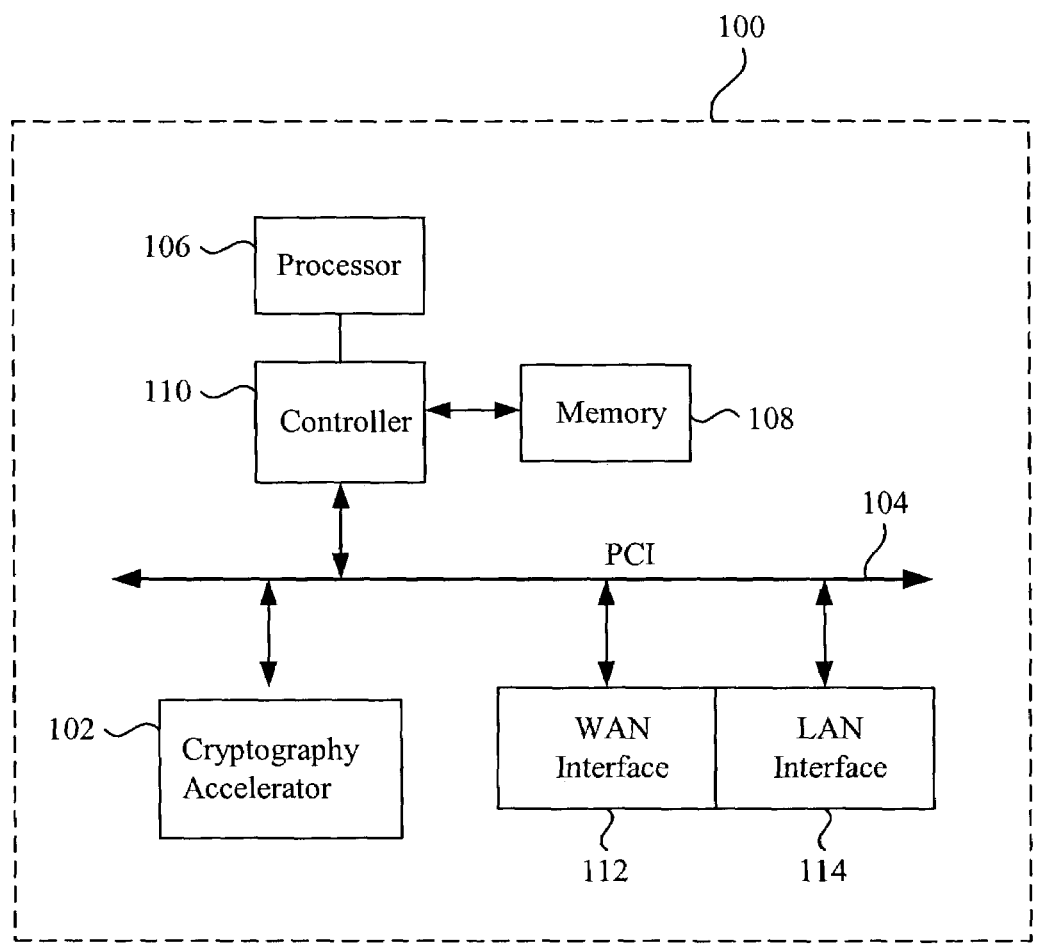
FIG. 1 is a diagrammatic representation of a system that can use the techniques of the present invention.

FIG. 1 is a diagrammatic representation of one example of a processing system 100 in accordance with an embodiment of the present invention. As shown in FIG. 1, the present invention may be implemented in a stand-alone cryptography accelerator 102 or as part of the system 100. Any logic, mechanism, or device operable to perform encryption, decryption, and/or authentication operations is referred to herein as a cryptography accelerator. In the described embodiment, the cryptography accelerator 102 is connected to a bus 104 such as a PCI bus via a standard on-chip PCI interface. The processing system 100 includes a processing unit 106 and a system memory unit 108. The processing unit 106 and the system memory unit 108 are coupled to the system bus 104 via a bridge and memory controller 110.

Although the processing unit 106 may be the central processing unit (CPU) of a system 100, it does not necessarily have to be the CPU. It can be one of a variety of processors in a multiprocessor system. In one example, a LAN interface 114 is provided to couple the processing system 100 to a local area network (LAN) to allow packet receipt and transmission. Similarly, a Wide Area Network (WAN) interface 112 can also be provided to connect the processing system to a WAN (not shown) such as the Internet. The WAN interface manages in-bound and outbound packets to allow automatic decryption and authentication processing.

According to various embodiments, the cryptography accelerator 102 is an application specific integrated circuit (ASIC) coupled to the processor 106. The cryptography accelerator 102 can also be a programmable logic device (PLD), field programmable gate array (FPGA), or other device coupled to the processor 106. According to specific embodiments, the cryptography accelerator 102 is implemented either on a card connected to the bus 104 or as a standalone chip integrated in the system 100.

In other embodiments, the cryptography accelerator 102 itself is integrated into the processing core of a CPU of system 100, such as that available from Tensilica Corporation of Santa Clara, Calif. or ARC Cores of San Jose, Calif. In another embodiment, techniques and mechanisms of the present invention are integrated into a CPU such as a CPU available from Intel Corporation of San Jose, Calif. or AMD Corporation of Sunnyvale, Calif. By implementing cryptography accelerator functionality entirely on the processor 106, a separate card or chip in the system 100 is not needed. In still other embodiments, the processing system 100 including the cryptography accelerator 102 is implemented as a system on a chip (SOC). The network interfaces, memory, processing core, and cryptography accelerator functionality are provided on a single integrated circuit device.

The cryptography accelerator 102 is capable of implementing various network security standards, such as Secure Sockets Layer/Transport Layer Security (SSL/TLS), which provide application-transparent encryption and authentication services for network traffic.

Network security standards such as Internet Protocol Security (IPSec) and Internet Key Exchange IKE provide authentication and encryption through the use of a variety of algorithms. Two commonly used hash algorithms are MD5 and the Secure Hash algorithm (SHA-1). Other hash algorithms such as MD4 and MD2 are also available. Two commonly used encryption algorithms are DES and RC4. Other encryption algorithms such as triple DES are also available. Authentication and encryption algorithms are described in Applied Cryptography, Bruce Schneier, John Wiley & Sons, Inc. (ISBN 0471128457), incorporated by reference in its entirety for all purposes. Even though many network security standards apply the same hash algorithms, different approaches are taken toward applying the hash algorithms to the actual authentication computation.

Various network security protocols such as IPSec specify performing operations to derive keys for data exchange, generate messages for key and data exchange verification, process records, etc. In typical implementations, performing operations for secured sessions entails making various functional calls to a cryptography accelerator. In various embodiments, a designer integrates a cryptography accelerator into a system and writes chip specific software to make the various function calls to the cryptography accelerator. The CPU periodically issues function calls to the cryptography accelerator to perform specific operations, such as DES processing, for example. Performing cryptography operations using the specialized cryptography accelerator typically improves the efficiency of cryptography processing.

However, issuing function calls to specific cryptography accelerators is not without cost. A designer typically writes software that specifically formats and provides data to the cryptography accelerator in a manner that may work only with the specific cryptography accelerator. In order to process data in a cryptography accelerator, data is generally copied from the memory space of the CPU to the memory space of the cryptography accelerator. Various bus, memory, and interface resources are consumed during various data transfers. Various parameters are determined, and data is formatted with particularity because various function calls can be made. Various packet processing, security association information management, and policy management operations complicate software development and sometimes reduce system efficiency.

According to various embodiments of the present invention, an abstraction layer is provided for managing function calls that can be made to a number of different cryptography accelerators. Instead of writing and rewriting chip specific software to perform a large number of low level operations to manage context information, process packets, and to derive communicaton keys, an abstraction layer is provided to reduce the interface complexity, make possible highly efficient system designs, and simplify software development.

Figure 2:
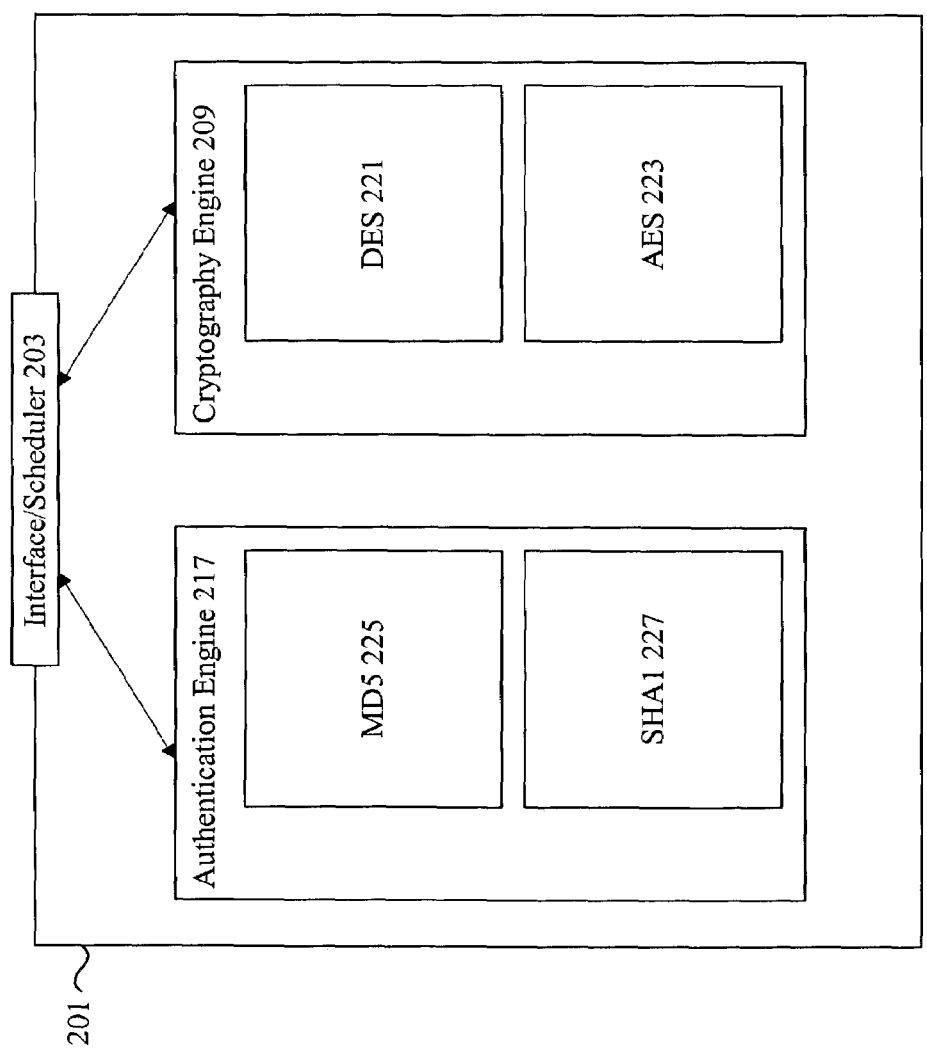
FIG. 2 is a diagrammatic representation of an integrated circuit containing processing cores for performing authentication and cryptography operations.

FIG. 2 is a diagrammatic representation of one example of a cryptography accelerator 201. The cryptography accelerator 201 includes an interface 203 connected to a host such as an external processor. According to various embodiments, the interface 203 receives information from the host for processing and sends information to the host when processing is completed. In one example, encrypted data associated with a Secure Socket Layer (SSL) exchange is received through the interface. The interface 203 includes a scheduler for determining whether to send data blocks to various processing engines such as authentication engine 217 and cryptography engine 209. In one embodiment, encryption engine 209 includes components such as a DES engine 221 and an RC4 engine 223. An authentication engine 217 includes components such as MD5 engine 225 and SHA1 engine 227. It should be noted that a cryptography accelerator 201 can include other components as well, such as a public key engine or cores for performing other authentication and encryption algorithms.

According to various embodiments, components for performing operations such as XOR operations are also included in the cryptography accelerator. In one example, an XOR component is included in the authentication engine so that SHA-1 and MD5 processed data can be combined together.

According to various embodiments, the techniques of the present invention are used in a secured session. Any message exchange sequence between two parties using both authentication and encryption and common session information known to both parties is referred to herein as a secured session. In one example, a secured session is an SSLv3 session. A secured session typically includes a handshake phase and a data exchange phase. A handshake phase often includes a key exchange sequence establishing common information, such as a shared key, for the transmission of data during the data exchange phase between two parties. Any mechanism involving exchanging information to establish a secured session between two entities is referred to herein as a handshake phase.

Figure 3A:
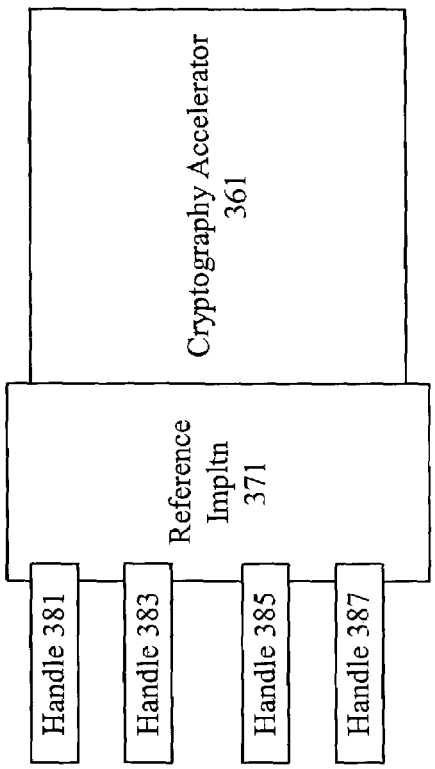
FIGS. 3A-3B are diagrammatic representations showing host interaction with reference implementations associated with specific cryptography accelerators.

FIG. 3A is a diagrammatic representation showing a cryptography accelerator and an associated mechanism for making function calls to the chip. A cryptography accelerator 311 is associated with a reference implementation 321. The reference implementation 321 includes a set of function calls used to communicate directly with the cryptography accelerator 311. Any set of function calls used to communicate directly with a cryptography accelerator is referred to herein as a reference implementation. Functions included in the reference implementation used to communicate with a cryptography accelerator are herein referred to as handles. In typical implementations, each cryptography accelerator 311 includes its own chip specific reference implementation 321. Each reference implementation 321 has its own chip specific set of handles 331, 333, 335.

In some examples, handles are used by software running on a host such as a CPU to pass data for processing to a cryptography accelerator 311. In other examples, handles are used to configure the cryptography accelerator to support specific algorithms such as DES or tripled DES. In one particular example, a handle is used to configure the size of context information passed through a cryptography accelerator. Information associated with data that identifies keys and algorithm information for processing the data is referred to herein as context information. A host may make a function call such as host_context_size(num) to reserve the size of context information used by a host. In typical implementations, software running on a host is configured to communicate directly with a cryptography accelerator 311 using specific function calls provided in the reference implementation 321.

When a host receives a packet from an interface such as a network interface, the host CPU typically performs packet processing to preprocess the data before the data is passed to the cryptography accelerator 311. In some examples, the data is padded, parsed, or security association information associated with the data is acquired. The host can then pass the data associated with a packet along with any other parameters specified by the reference implementation 321 to the cryptography accelerator 311 for processing of the data. The software running on the host CPU typically is written by a designer and specifically tailored to perform processing and to pass data and parameters in a format specified by the reference implementation 321. In many instances, and large amount of processing and formatting is performed by a host CPU before data can be encrypted or authenticated by a cryptography accelerator 311.

Figure 3B:
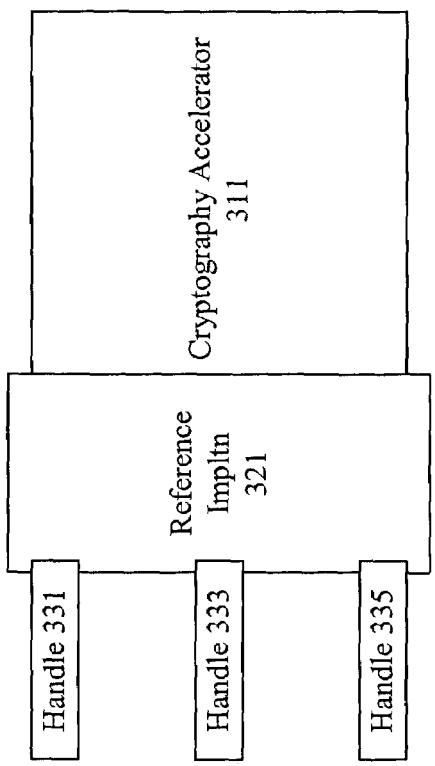

FIG. 3B is a diagrammatic representation showing a different cryptography accelerator associated with a different reference implementation 371. Although cryptography accelerator 361 and cryptography accelerator 311 may support much of the same functionality, there may be subtle and substantial differences in their reference implementations. In some examples, cryptography accelerator 361 supports all of the algorithms supported by cryptography accelerator 311 but also supports more newly developed algorithms. In other example, cryptography accelerator 311 may include memory for maintaining security association information associated with particular packets while cryptography accelerator 361 expects that the security association information is passed with a packet as parameter information. Consequently, cryptography accelerator 361 has a reference implementation 371 that is different from reference implementation 321. That is, reference implementation 371 may include a different set of handles (e.g., handles 381, 383, 385, or 387) or function calls used to directly communicate with the cryptography accelerator 361.

For example, handles 381 and handle 331 may both be the function calls used to pass data to their associated cryptography accelerators for DES processing. However, handles 381 may have a different parameter set than handle 331, or the data may have to be formatted differently depending on the specific chip. Because reference implementations are chip specific, software running on a host CPU must typically be written to perform processing and to make function calls as specified by the particular reference implementations.

When a system including a cryptography accelerator 311 is modified to include cryptography accelerator 361, software is updated to perform processing to make function calls as specified by the new reference implementation even if the cryptography accelerator supports largely the same functionality. In one example, a system may be upgraded to include a cryptography accelerator 361 that outperforms a cryptography accelerator 311. Even though the two cryptography accelerators support the same functionality and may in fact be in the same family of cryptography accelerators provided by a vendor, software running on a host is modified typically in a fairly painstaking manner to reflect the new specifications of the reference implementation 371.

FIG. 4 is a diagrammatic representation showing a cryptography accelerator and an abstraction layer 431 used to allow designer configured software to be more compatible with different cryptography accelerators. Any software prepared by a designer of a system using a cryptography accelerator is referred to herein as designer configured software. In typical implementations, the designer configured software accesses the cryptography accelerator through an application program interface. According to various embodiments, software running on a host CPU is written to use the handles provided by the abstraction layer 431 associated with the application program interface. In many instances, the software running on the host CPU need not know the exact specifications of the cryptography accelerator communicating with abstraction layer 431. Any set of handles that are part of an application program interface that can be used to communicate with multiple different cryptography accelerators each with different reference implementations is referred to herein as an abstraction layer.

In some embodiments, an abstraction layer may be software provided along with a cryptography accelerator to a designer. In other embodiments, an abstraction layer may be an integrated circuit coupled to a cryptography accelerator and a host CPU. In still other embodiments, the abstraction layer may be a front end associated with a number of different cryptography accelerators. In one example, abstraction layer 431 allows designer configured software running on a host CPU to communicate with different cryptography accelerators in a family of cryptography accelerators all providing substantially the same functionality but with minor variations in supported algorithms and chip performance.

According to various embodiments, abstraction layer 431 allows software running on a host CPU to communicate with different cryptography accelerators with substantially different functionality. As would be appreciated by persons of skill in the art, software is stored in a computer readable medium such as a memory thus creating a computer program product. The abstraction layer 431 can be configured to map generic function calls 441, 443, 445, 447 to chip specific function calls 421, 423, 425 associated with reference implementation 411. Any handle associated with an abstraction layer is referred to herein as a generic handle or a generic function call. In some examples, a simple one-to-one mapping from the generic handle to the chip specific handle is provided. In other examples, abstraction layer 431 determines what functionality is supported by the cryptography accelerator 401 and returns an error and error information to a user when a generic function call has no corresponding chip specific function call. The abstraction layer 431 can also receive function calls from the host and group the function calls in a manner that would allow making a single chip specific function call to the cryptography accelerator 401.

The abstraction layer 431 also maintains context information such as security association information and policy information used to instruct a cryptography accelerator 401 on how to encrypt or authenticate data. In some embodiments, techniques of the present invention contemplate using the abstraction layer 431 to perform packet processing to more efficiently and effectively format data and pass data along with associated parameters to the cryptography accelerator 401. The packet processing capabilities of the abstraction layer are provided to simply development of designer configured software. In some instances, a generic handle 441 is a function call requiring little processing or host interaction to effectively allow data to be received directly from a network interface.

Figure 5:
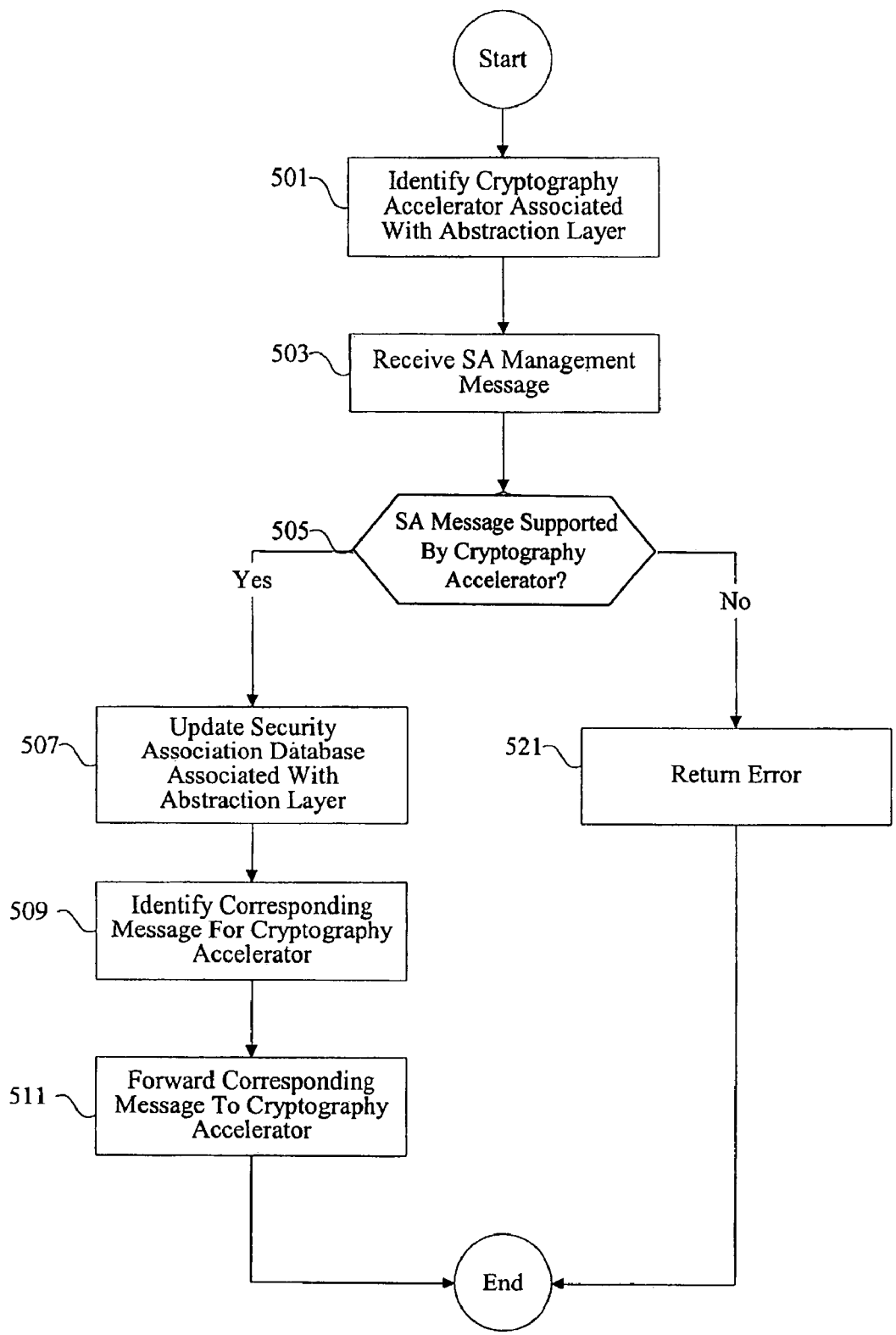
FIG. 5 is a flow process diagram showing management of a security association database using an application programming interface abstraction layer.

According to various embodiments of the present invention, the abstraction layer 431 can be configured to provide a variety of function calls for accessing a cryptography accelerator. In some examples, function calls for configuring a cryptography accelerator, managing policy information and key management are provided. Functions associated with the configuration of a cryptography accelerator include initializing the cryptography accelerator with default parameters, initializing the cryptography accelerator with predetermined register values, initializing the cryptography accelerator with a predetermined host context size, and initializing the cryptography accelerator according to a predefined encryption/decryption algorithm (e.g., triple DES) or authentication algorithm. FIG. 5 is a flow process diagram showing techniques for managing security association information. Any information identifying keys and how to use the keys to encrypt or decrypt data is referred to herein as security association information. Security association information can include keys and algorithm information.

At 501, a cryptography accelerator associated with the abstraction layer is identified. According to various embodiments, the abstraction layer is manually configured to communicate with specific cryptography accelerators automatically. In other examples, the abstraction layer automatically identifies which cryptography accelerator out of a family of cryptography accelerators is being used. At 503, the security association management message is received. According to various embodiments, the security association management information is an initialize security association database message or a message relating to adding, updating, or deleting a security association entry.

Security association entries are typically identified by source and destination addresses along with source and destination port numbers. Fields for each entry typically include keys and algorithms used. At 505, the abstraction layer determines whether the security association message is supported by the cryptography accelerator. In some reference implementations for particular cryptography accelerators, there may be very specific delete or flush entry messages that may not be supported by other cryptography accelerators.

In some instances, the messages can be mapped onto other messages to allow for similar or deletion of a security association entry. In other examples, the message or functionality may be completely unsupported. If the functionality is unsupported, an error is returned at 521. To allow for more efficient and accurate diagnoses of problems, error information is typically returned with the error. If it is determined that the message is supported or can be mapped to a similar function, the security association database is updated as indicated by the message at 507. At 509, the message is mapped to a function call specific to be cryptography accelerator associated with the abstraction layer. The mapping may be one-to-one or similar type of mapping. At 511, the message may or may not be forwarded to the cryptography accelerator. In many instances, managing the security association information may not entail forwarding the message to the cryptography accelerator.

Figure 6:
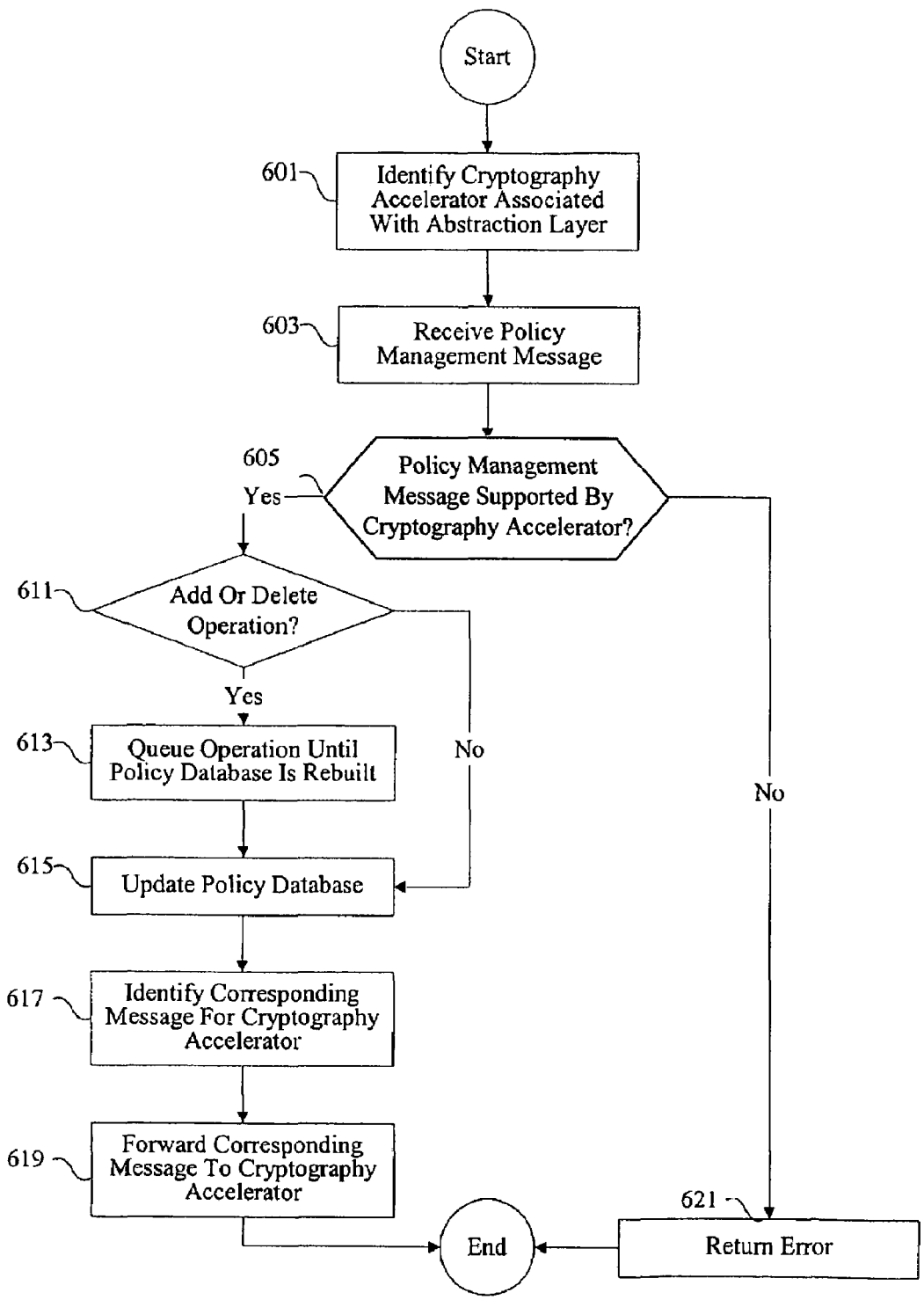
FIG. 6 is a flow process diagram showing management of a policy database using an application programming interface abstraction layer.

FIG. 6 is a flow process diagram showing techniques for managing policy at an abstraction layer. The policies identify how data is processed in a cryptography accelerator. For example, if a cryptography accelerator includes four different DES engines, policy information identifies whether the packets are distributed to the DES engines in round robin fashion or whether particular packets are always assigned to the same engine. Typically, a particular policy applies to one or more flows identifiable by source and destination addresses along with source and destination port numbers.

In some examples, policy information can be used to determine whether to packet is dropped by cryptography accelerator, pass through a cryptography accelerator, or secured by the cryptography accelerator. At 601, the cryptography accelerator associated with the abstraction layer is identified. It should be noted that the cryptography accelerator may be identified when the abstraction layer is first initiated and typically need not be re-identified every time a packet is received by the abstraction layer.

At 603, a policy management message is received. At 605, it is determined if the policy management messages supported by the cryptography accelerator. If it is not, an error along with error information is returned at 621. If the policy management message is supported or the message can be mapped to a function with similar effects, it is determined at 611 if the policy management message is an add or delete operation. Adding or deleting policy management messages can be a processor intensive operation. Consequently, the techniques of the present invention allow for the queueing of add and delete policy information messages until the policy database update or policy database rebuild messages are received at 613. This allows multiple add and delete policy information messages to be implemented in a single instance. If the message is not an add or delete operation, the policy database is updated at 615. At 617, a corresponding message for the cryptography accelerator is identified. At 619, the message may or may not be forwarded to the cryptography accelerator.

Figure 7:
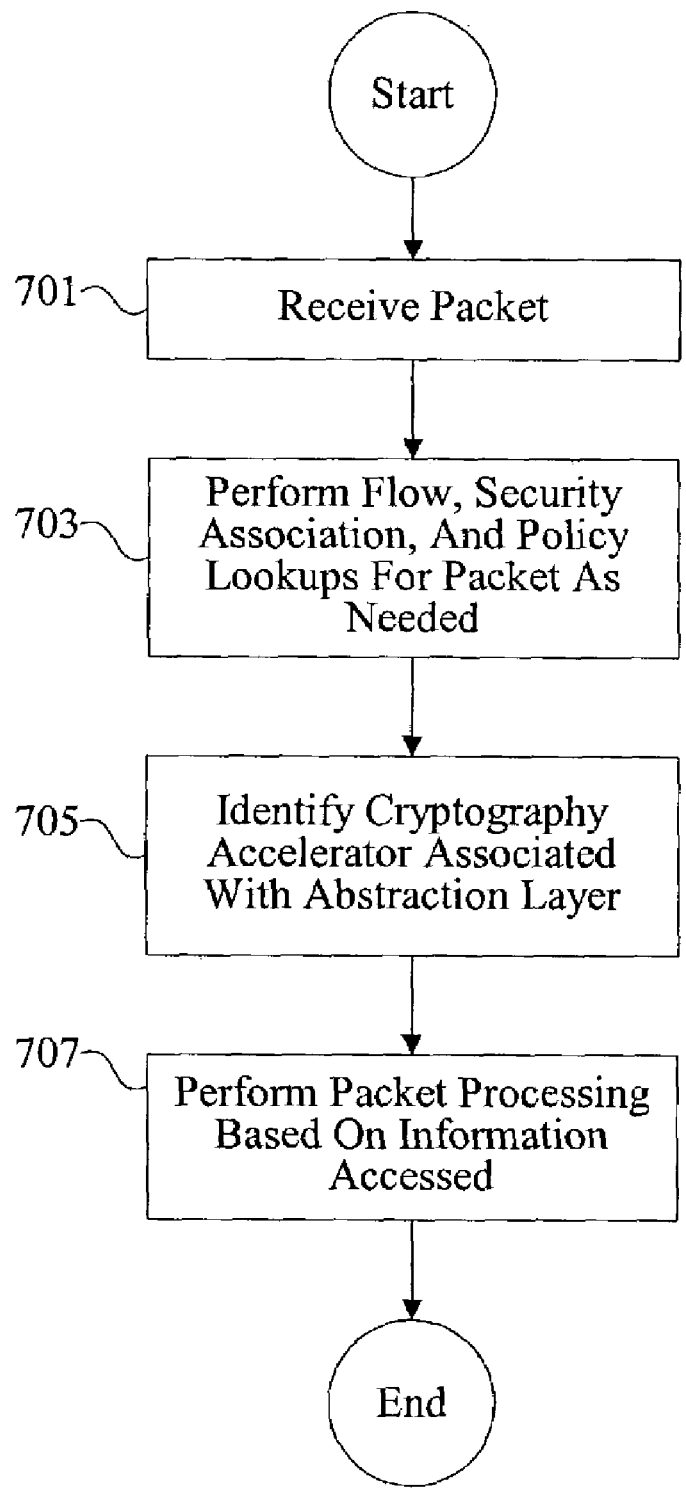
FIG. 7 is a flow process diagram showing packet processing using an application programming interface abstraction layer.

FIG. 7 is a flow process diagram showing techniques for packet processing and an abstraction layer. The packet processing is often performed to provide a cryptography accelerator with data in the correct format along with a particular parameter set. At 701, a packet is received. In typical implementations, a packet received over a network database is processed by a host using chip specific software to prepare data for processing by cryptography accelerator. In some examples, a cryptography accelerator may require data to be provided with no padding. In other examples, the cryptography may expect security association information to be provided as parameters along with data to be encrypted.

A designer writes software to perform packet processing as specified by particular cryptography accelerators. However, when the system is updated with a new cryptography accelerator, the software written for the prior cryptography accelerator typically is not operable to communicate with the new cryptography accelerator. According to various embodiments, techniques of the present invention provided abstraction layer that performs a substantial amount of the packet processing. In some instances, a packet received over a network interface is processed by the abstraction layer without the need for any designer written software processing. At 703, the abstraction layer is configured to perform flow, security information, and policy lookups based on the information associated with the packet. At 705, a cryptography accelerator associated with the abstraction layer is identified. As noted above, the cryptography accelerator may be identified once upon initialization and does not necessarily need to be identified every time a packet is received. Using the flow, security association, and policy information, the packet is formatted and forwarded at 707.

Figure 8:
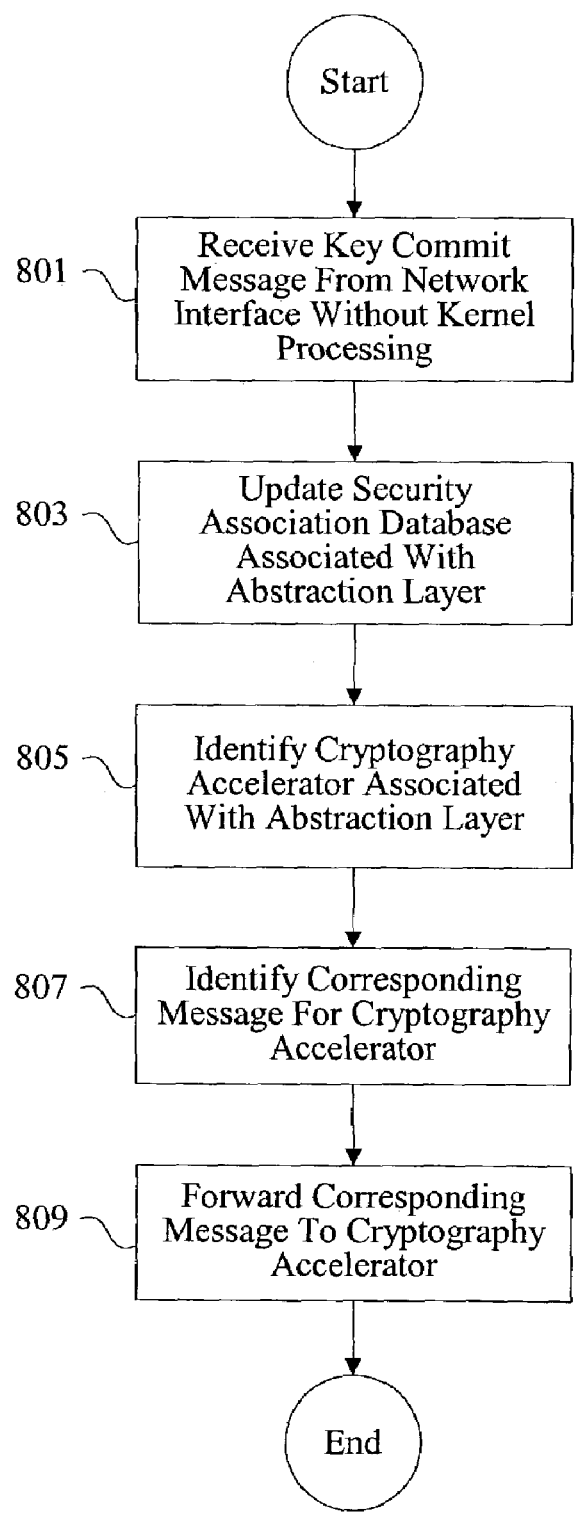
FIG. 8 is a flow process diagram showing a key commit interface using an application programming interface abstraction layer.

FIG. 8 is a flow process diagram showing an example of a technique for key management at an abstraction layer. According to various embodiments, the key management portion for the abstraction layer is used to send and receive key commit messages such as PF_KEY messages. In typical implementations, key commit messages are processed by designer provided software before processing by a cryptography accelerator. The techniques of the present invention allow key commit messages to bypass a kernel and instead be processed by an abstraction layer.

At 801, a key commit message is received from a network interface without kernel processing. That is, the key commit message is received directly without intervention by designer provided software. At 803, a security association database associated with the abstraction layer is updated. At 805, the cryptography accelerator is identified. At 807, a corresponding message specified for the cryptography accelerators is identified and the message is forwarded at 809. According to various embodiments, the key commit message is provided to initiate key negotiation and deliver session keys from a session negotiation application such as IKE. The techniques of the present invention provide a key commit function call using the abstraction layer that is independent of the underlying cryptography accelerator.

It should be noted that although the techniques of the present invention have been described in the context of security association management, policy management, packet processing, and key commit processing, other handles and other groups or handles are contemplated. In one example, a device configuration management functions are provided to register existing hardware and send control packets to a cryptography accelerator. The configuration management functions can also be used to send test packets to the device for purposes of debugging or to configure a cryptography accelerator to handle particular algorithms. Various generic function call can be grouped in different manners instead of the security association management, policy management, packet processing, and key commit processing groups noted above.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method for configuring and managing a cryptography accelerator, the method comprising:
   receiving a packet and a generic function call requesting a cryptographic operation at an application program interface (API) abstraction layer, the API abstraction layer operable to communicate with a plurality of cryptography accelerators, wherein the plurality of cryptographic accelerators perform the requested cryptographic operation and wherein each of the plurality of cryptographic accelerators supports a different specific function call for the requested cryptographic operation;
   identifying, at the API abstraction layer, a cryptographic accelerator in the plurality of cryptography accelerators for performing the requested cryptographic operation on the received packet;
   mapping the generic function call for the requested cryptographic operation to the specific function call for the requested cryptographic operation supported by the identified cryptographic accelerator;
   processing the received packet at the API abstraction layer according to the requirements of the identified cryptographic accelerator; and
   sending the processed packet and the specific function call for the requested cryptographic operation to the identified cryptography accelerator.

2. The method of claim 1, further comprising identifying policy information corresponding to the packet.

3. The method of claim 1, further comprising identifying flow information corresponding to the packet.

4. The method of claim 1, further comprising removing the header associated with the packet.

5. The method of claim 1, wherein processing the received packet at the API abstraction layer comprises padding data associated with the packet.

6. The method of claim 1, further comprising receiving a configuration information message at the API abstraction layer before the packet is received.

7. The method of claim 6, further comprising determining if a function specified by the configuration information message is supported by the cryptography accelerator.

8. The method of claim 7, further comprising sending the function specified by the configuration information message to the cryptography accelerator in a function call if the function specified by the configuration information message is supported and returning an error if the function specified by the configuration information message is not supported.

9. The method of claim 7, wherein the function specified by the configuration information message indicates that the cryptography accelerator should be initialized with default parameters.

10. The method of claim 7, wherein the function specified by the configuration information message indicates that the first cryptography accelerator should be initialized with predetermined register values.

11. The method of claim 7, wherein the function specified by the configuration information message indicates that the cryptography accelerator should be initialized with predetermined host context size.

12. The method of claim 6, further comprising:
mapping the function specified by the configuration message to an associated function supported by the cryptography accelerator if the function specified by the configuration is not supported by the cryptography accelerator; and
sending the mapped function to the cryptography accelerator in a function call.

13. The method of claim 1, further comprising receiving a security association management operation at API abstraction layer.

14. The method of claim 13, wherein the security association management operation includes one of adding a security association, deleting a security association, or updating a security association and acquiring information statistics associated with the security association.

15. The method of claim 13, further comprising updating a security association table associated with the API abstraction layer.

16. The method of claim 13, wherein the security association management operation includes acquiring information statistics associated with the security association.

17. The method of claim 1, further comprising receiving a policy management operation at the API abstraction layer.

18. The method of claim 17, wherein the policy management operation includes one of adding a policy, deleting a policy, or updating a policy.

19. The method of claim 17, further comprising scheduling the policy management operation, wherein the policy management operation is scheduled to occur during a rebuild of a policy management database.

20. The method of claim 19, updating the policy management database associated with the API abstraction layer.

21. The method of claim 17, further comprising determining if the security association management operation is supported by the cryptography accelerator.

22. The method of claim 1, receiving a PF_KEY commit operation at the API abstraction layer.

23. The method of claim 22, performing an add security association information operation when the PF_KEY commit operation is received.

24. The method of claim 1, receiving a PF_KEY delete operation at the API abstraction layer.

25. The method of claim 24, performing a delete security association information operation when the PF_KEY delete operation is received.

26. An apparatus for configuring and managing a cryptography accelerator, the apparatus comprising:
means for receiving a generic function call requesting a cryptographic operation and an associated packet at an application program interface (API) abstraction layer, the API abstraction layer operable to communicate with a plurality of cryptography accelerators, wherein the plurality of cryptography accelerators perform the requested cryptographic operation and wherein each of the plurality of cryptographic accelerators supports a different specific function call for the requested cryptographic operation;
means for identifying, at the API abstraction layer, a cryptographic accelerator in the plurality of cryptography accelerators for performing the requested cryptographic operation on the received packet;
means for mapping the generic function call for the requested cryptographic operation to the specific function call for the requested cryptographic operation supported by the identified cryptographic accelerator;
means for processing the received packet at the API abstraction layer according to the requirements of the identified cryptographic accelerator; and
means for sending the processed packet and the specific function call for the requested cryptographic operation to the identified cryptography accelerator.

27. The apparatus of claim 26, further comprising means for identifying policy information corresponding to the packet.

28. The apparatus of claim 26, further comprising means for identifying flow information corresponding to the packet.

29. A computer program product comprising computer readable medium including computer code stored therein, the computer code enabling the configuration and management of a cryptography accelerator, comprising:
computer code for enabling a processor to receive a generic function call requesting a cryptographic operation and an associated packet at an application program interface (API) abstraction layer, the API abstraction layer operable to communicate with a plurality of cryptography accelerators, wherein the plurality of cryptographic accelerators perform the requested cryptographic operation and wherein each of the plurality of cryptographic accelerators supports a different specific function call for the requested cryptographic operation;
computer code for enabling the processor to identify, at the API abstraction layer, a cryptographic accelerator in the plurality of cryptography accelerators for performing the requested cryptographic operation on the received packet;
computer code for enabling the processor to map the generic function call for the requested cryptographic operation to the specific function call for the requested cryptographic operation supported by the identified cryptographic accelerator; and
computer code for enabling the processor to send data associated with the packet and the specific function call for the requested cryptographic operation to the identified cryptography accelerator.

30. The computer program product of claim 29, further comprising computer code for enabling the processor to identify policy information corresponding to the packet.

31. The computer program product of claim 29, further comprising computer code for enabling the processor to identify flow information corresponding to the packet.

32. A system for providing cryptographic processing of a plurality of packets, comprising:
a host processor for requesting a cryptographic function using a generic function call included in a set of generic function calls, wherein a plurality of cryptography accelerators perform the requested cryptographic function and wherein each of the plurality of cryptographic accelerators supports a different specific function call for the requested cryptographic function; and an application program interface (API) abstraction layer operable to communicate with the host and a cryptography accelerator in the plurality of cryptography accelerators to determine if the cryptographic function requested in the generic function call is supported by the cryptography accelerator, and to map the generic function call to a specific function call for the requested cryptographic function specified for the cryptographic accelerator if the requested cryptographic function is supported;

wherein the cryptography accelerator is operable to perform a set of cryptographic functions.

33. The system of claim 32, wherein the API abstraction layer is further operable to identify policy information corresponding to the packet.

34. The system of claim 32, wherein the (API) abstraction layer is further operable to identify flow information corresponding to a packet in the plurality of packets.

35. The system of claim 32, wherein the API abstraction layer is operable to receive a configuration information message before a packet is received.

36. The system of claim 35, wherein the API abstraction layer is operable to determine if a function specified by the configuration information message is supported by the cryptography accelerator.

37. The system of claim 36, wherein the API abstraction layer is operable to send the function specified by the configuration information message to the cryptography accelerator in a function call if the function specified by the configuration information message is supported and to return an error if the function specified by the configuration information message is not supported.

38. The system of claim 36, wherein the function specified by the configuration information message indicates that the cryptography accelerator should be initialized with default parameters.

39. The system of claim 36, wherein the function specified by the configuration information message indicates that the cryptography accelerator should be initialized with predetermined register values.

40. The system of claim 36, wherein the function specified by the configuration information message indicates that the first cryptography accelerator should be initialized with predetermined host context size.

41. The system of claim 32, wherein the API abstraction layer is operable to receive a security association management operation.

42. The system of claim 41, wherein the security association management operation includes one of adding a security association, deleting a security association, or updating a security association and acquiring information statistics associated with the security association.

43. The system of claim 32, wherein the API abstraction layer is further operable to process a packet in the plurality of packets according to a set of requirements of the cryptographic accelerator.

44. The system of claim 43, wherein the API abstraction layer is operable to pad data associated with the packet as specified by the set of cryptographic accelerator requirements.

45. The system of claim 32, wherein the API abstraction layer is further operable to:

map the function specified by the configuration message to an associated function supported by the cryptography accelerator if the function specified by the configuration is not supported by the cryptography accelerator; and send the mapped function to the cryptography accelerator in a function call.

46. A method for configuring and managing a cryptography accelerator, the method comprising:

receiving a packet at an application program interface (API) abstraction layer, the API abstraction layer operable to communicate with a plurality of cryptography accelerators;

receiving a policy management operation at the API abstraction layer;

scheduling the policy management operation instead of forwarding the policy management operation to the cryptography accelerator, wherein the policy management operation is scheduled to occur during a rebuild of a policy management database;

identifying, at the API abstraction layer, a cryptographic accelerator in the plurality of cryptography accelerators for performing cryptographic processing on the received packet;

identifying security association information corresponding to the packet;

processing the received packet at the API abstraction layer according to the requirements of the identified cryptographic accelerator and the identified security association information; and sending the processed packet to cryptography accelerator.

* * * * *